(12) United States Patent
Smeets

(10) Patent No.: US 9,397,903 B2
(45) Date of Patent: Jul. 19, 2016

(54) METHOD OF DETERMINING AN ATTRIBUTE OF A SERVER

(75) Inventor: Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 227 days.

(21) Appl. No.: 14/124,000

(22) PCT Filed: Jun. 5, 2012

(86) PCT No.: PCT/EP2012/060551
§ 371 (c)(1),
(2), (4) Date: Dec. 5, 2013

(87) PCT Pub. No.: WO2012/168212
PCT Pub. Date: Dec. 13, 2012

(65) Prior Publication Data
US 2014/0101311 A1    Apr. 10, 2014

Related U.S. Application Data

(60) Provisional application No. 61/495,438, filed on Jun. 10, 2011.

(30) Foreign Application Priority Data

Jun. 8, 2011 (EP) .................... 11169132

(51) Int. Cl.
*G06F 15/173* (2006.01)
*H04L 12/26* (2006.01)
*G06F 21/57* (2013.01)
*G06F 21/64* (2013.01)

(52) U.S. Cl.
CPC ............... *H04L 43/04* (2013.01); *G06F 21/57* (2013.01); *G06F 21/64* (2013.01)

(58) Field of Classification Search
CPC ......... H04L 12/26; H04L 43/04; G06F 21/57; G06F 21/64
USPC ............................ 713/167; 709/224, 217, 219
See application file for complete search history.

(56) References Cited

U.S. PATENT DOCUMENTS

| 8,510,718 B2 * | 8/2013 | Hemade | H04L 41/0869 717/126 |
| 2005/0138384 A1 | 6/2005 | Brickell et al. | |
| 2007/0050846 A1 | 3/2007 | Xie et al. | |

(Continued)

OTHER PUBLICATIONS

George Coker et al. "Principles of Remote Attestation", Sep. 24, 2009, pp. 1-38, XP055011625.*

(Continued)

*Primary Examiner* — Frantz Jean
(74) *Attorney, Agent, or Firm* — Murphy, Bilak & Homiller, PLLC

(57) ABSTRACT

A method of determining an operational attribute of a server executed on a first execution platform and providing a service, the method comprising: performing a measurement indicative of an operational attribute of the server, wherein the measurement is performed by a platform observer system executed on said first execution platform; communicating a result of said measurement to an external observer system; wherein the communicating comprises protecting secrecy of the communicated result; verifying, by the external observer system, that the received measurement result is indicative of a measurement performed on said server.

12 Claims, 3 Drawing Sheets

(56) References Cited

U.S. PATENT DOCUMENTS

| | | |
|---|---|---|
| 2008/0178176 A1 | 7/2008 | Berger et al. |
| 2008/0320308 A1 | 12/2008 | Kostiainen et al. |
| 2009/0217374 A1 | 8/2009 | Liu et al. |
| 2010/0082984 A1 | 4/2010 | Ellison et al. |
| 2015/0033004 A1* | 1/2015 | Smeets .................. G06F 21/57 713/2 |

OTHER PUBLICATIONS

Coker, G., et al., "Principles of Remote Attestation," International Journal of Information Security—Special Issue: 10th International Conference on Information and Communications Security (ICICS); Jun. 2011. pp. 63-81. vol. 10, Issue 2.

Author Unknown, "Application and Network Performance Monitoring in a Virtualized Environment," Network Instruments, LLC.; Network Instruments White Paper. Mar. 31, 2009. pp. 1-5.

Author Unknown, "AMD64 Virtualization Codenamed 'Pacifica' Technology," AMD; Advanced Mico Devices; Secure Virtual Machine Architecture Reference Manual. May 2005. pp. i.-98.

Author Unknown, "TCG Specification Architecture Overview," TCG, Trusted Computing Group, Incorporated. Specification; Revision 1.3; Mar. 28, 2007. pp. i-54.

Author Unknown, "Virtual Trusted Platform Module," International Business Machines (IBM); Our People; pp. 1-3.

Author Unknown, "D04.7 VTPM Architecture," Information Society Technologies (ITC); IST-027365; Open_TC; Open Trusted Computing Report. May 29, 2009. pp. 1-48.

Domingues, P., et al., "Evaluating the Performance and Intrusiveness of Virtual Machines for Desktop Grid Computing," Parallel & Distributed Processing, 2009. IPDPS 2009. IEEE International Symposium. May 23-29, 2009. pp. 1-8. Rome, Italy.

Azab, A. M., et al., "HyperSentry: Enabling Stealthy In-context Measurement of Hypervisor Integrity," ACM. CCS '10 Proceedings of the 17th ACM Conference on Computer and Communications Security. 2010. pp. 38-49.

Parno, B., "Trust Extension as a Mechanism for Secure Code Execution on Commodity Computers," Carnegie Mellon University; Research Showcase; Dissertations; Theses and Dissertations. Paper 28. 2010. pp. 1-204.

Stumpf, F. "Leveraging Attestation Techniques for Trust Establishment in Distributed Systems," Dissertation; Darmstadt University of Technology; 2010. pp. 1-236.

Shi, E., et al., "BIND: A Fine-Grained Attestation Service for Secure Distributed Systems," Security and Privacy, 2005 IEEE Symposium. May 8-11, 2005. pp. 154-168.

Frey, J., "Network Instruments Puts Virtualized Systems on Tap," Enterprise Management Associates, Inc. (EMA); Impact Brief. 2009. pp. 1-3.

Author Unknown, "Network Instruments," Network Instruments, LLC. 2013. pp. 1-2 (available online at: www.networkinstruments.com).

* cited by examiner

METHOD OF DETERMINING AN ATTRIBUTE OF A SERVER

TECHNICAL FIELD

Disclosed are a system and corresponding method for securely determining an attribute of a server.

BACKGROUND

For many years, server computers have been widely used for performing computational services.

Traditionally, users of server capacity owned the server hardware and thus had control over the minimum capacity and/or other relevant attributes of the server system such as the number of users, latency, response times, etc. However, recently it has become increasingly common for users of computational services not to own the server itself but to rent the server capability required to perform the desired computational services. Such a server capability may then be offered using known virtualization techniques meaning that the customer has access to server functions/capabilities, but the actual server hardware may be shared with others.

License systems (or sometimes called license schemes) are widely used on servers to enforce agreements on what services can be used and possibly on limits of capacity for those services. Some of those licensing systems use pure software solutions in which the server system is equipped with a licensing software package that the service software requires to be in place and which must be activated by entering a license key (string). Other licensing systems use special hardware (e.g. in form of a USB dongle) that must be inserted in the server and which will activate the license for one or more licensed services. Besides the availability of a service, the (legal) license agreement may include statements on the capacity. Typically the customer and service provider agree on limits of the capacity (e.g. max number of connections per minute and/or a guaranteed minimum capability to handle a certain number of connections per minute).

In situations when the user of the computational service owns and has control over the server hardware, a licensing system may only need to enforce that certain agreed (upper) limits are not exceeded. However, when the user of the computational service rents the server capability from a service provider, the problem occurs in such a setup as to how both customer and service provider can be certain that the license agreements are met. A known technique is to install so-called observers that monitor (and can generate reports on) the behaviour of the service. An example of such a system is the so-called Virtual TAP system available from Network Instruments, Minnetonka, Minn., USA. However existing systems fail to address the above question in a setting where there are opposing interests by the user of the services and the provider of the service. For example, the provider of the service may allocate more resources to another customer's virtual server, thus causing the service capacity to fall below the agreed lower limit.

Current mechanisms for licensing of software or services have been developed in a setting wherein the customer owned or rented a hardware system (for the purpose of this description referred to as the "server computer"), and then installed the licensed product on this server computer (possibly with the assistance of the vendor of the licensed product). In this setup the customer had good control of the minimum capacity of the service. The service vendor on the other hand had, through his license system, means to control that agreed capacity limits were not exceeded.

When the server is a virtualized service—or what in cloud technology is also referred to as Platform as a Service (PaaS)—the customer may not own the physical hardware and server software but only has access to server functionality. In order to verify that he gets the agreed capacity, the customer might install probes that monitor the service using products as disclosed in the white paper "Application and Network Performance Monitoring in a Virtualized Environment", March 2009, by NetworkInstruments (currently available as an internet publication at http://www.networkinstruments.com/assets/pdf/virtualization_wp.pdf).

However, solutions like this may not be suitable when the PaaS is under control of someone who has (e.g. economically) opposing interests. The PaaS vendor has an interest in allocating resources to others (i.e. hosting more customers). In-system observers can be tricked to report wrongly and external observers cannot access minimal capacity unless doing active capacity measurements which wastes capacity, or they must passively monitor and collect data from which capacity estimates could be computed.

Hence, it is desirable to provide a system by which customer and service provider can efficiently, reliably and trustworthily determine attributes of a server, even if the server is a virtualised server or execution platform. For example, in the context of verifying license agreements, it is desirable to provide a system by which customer and service provider can reliably and trustworthily obtain information allowing them to verify that certain agreed license terms on capacity are met even when the service is running on a virtualized server hardware.

SUMMARY

Disclosed herein is a method of determining an operational attribute of a server executed on a first execution platform and providing a service, the method comprising:
  performing a measurement indicative of an operational attribute of the server, wherein the measurement is performed by a platform observer system executed on said first execution platform;
  communicating a result of said measurement to an external observer system; wherein the communicating comprises protecting secrecy of the communicated result;
  verifying, by the external observer system, that the received measurement result is indicative of a measurement performed on said server.

Further disclosed herein are embodiments of a method of determining an operational attribute of a server executed on a first execution platform and providing a service, the method comprising performing by an external observer system, external to the first execution platform, the following acts:
  receiving, from a platform observer system executed on said first execution platform, a result of a measurement indicative of an operational attribute of the server; wherein at least the secrecy of the received result is protected;
  verifying that the received measurement result is indicative of a measurement performed on said server.

Further disclosed herein are embodiments of a method of determining an operational attribute of a server executed on a first execution platform and providing a service, the method comprising:
  performing, by a platform observer system executed on said first execution platform, a measurement indicative of an operational attribute of the server;

communicating a result of said measurement to an external observer system; wherein the communicating comprises protecting secrecy of the communicated result, communicating at least one verification data item to the external observer system allowing the external observer system to verify that the received measurement result is indicative of a measurement performed on said server.

The verification data item may be any data item allowing the external observer system to verify that the measurement was actually performed on the same server that is providing the service. Examples of suitable verification data items include a secret value bound to a first state of the server, and static state information of the server.

By securely combining the observations of the in-system and external observers, the risk that the monitoring process is tricked by a PaaS vendor (e.g. by selectively increasing the capacity of the system at the time of measurement or by letting a platform observer perform measurements on a server different from the server that actually provides the service) is reduced.

Hence embodiments of the method disclosed herein provide a securely combined measurement of an in-system observer and an external observer.

In some embodiments, digital signatures and protected states (e.g. in the form of registers) of the first execution platform may be used to secure the reporting from the platform observer system to the external observer system against manipulation.

For the purpose of the present description, the secure combination of the external observer(s) and the platform observer is referred to as forming an observer claw.

In some embodiments, the method comprises performing said measurement at a predetermined measurement time, e.g. as determined by the platform observer system and/or by the external observer system, e.g. by means of one or more timers.

For the purpose of the present description the term server is intended to refer to a set of one or more processes executed on a data processing system under control of an operating system, and operable to provide a processing service, e.g. a data processing service, a signal processing service, etc. The server may be operable to provide said service to one or more client programs executed on the same or a different data processing system. In particular, the term server is intended to comprise a set of processes executed in a virtualised environment, e.g. utilising a hardware virtualisation technique.

Hardware virtualization or platform virtualization refers to the creation of a virtual machine that acts like a real computer with an operating system. Software executed on these virtual machines is separated from the underlying hardware resources. In hardware virtualization, the term host machine refers to the actual, physical machine on which the virtualization takes place; the term guest machine, however, refers to the virtual machine. The software or firmware that creates a virtual machine on the host hardware is called Hypervisor or Virtual Machine Monitor.

The operational attribute may be any attribute of the server indicative of an operational performance of the server with respect to the provision of the service. Examples of such attributes may include a capacity, a number of users, a latency, a response time, etc. or combinations thereof. Accordingly, the measurement of the operational attribute may comprise a measurement of one or more of the above examples of attributes, e.g. by means of a Trusted Platform Module (TPM) such as a virtual TPM, which allows an observer to measure the system performance.

In some embodiments the platform observer system comprises a first observer module comprised in the server, and a second observer module executable as an observer process separate from the server but executed on said first execution platform. The first and/or the second observer module may be implemented at least in part as respective software modules.

In some embodiments, the method comprises performing said measurement indicative of an operational attribute of the server by the first observer module included in the server;

communicating a result of said measurement by the first observer module to said second observer module executed on said first execution platform, wherein the communicating comprises integrity protecting, e.g. cryptographically integrity protecting, the communicated result;

communicating the communicated result of said measurement by the second observer module to the external observer system; wherein the communicating comprises protecting secrecy of the communicated result;

verifying, by the external observer system, that the received measurement result is indicative of a measurement performed on said server.

Hence, in some embodiments of the method described herein, the first observer module measures the system performance (or other attribute), and the measured performance is reported—by means of a secured communication via the observer process as a trusted middleman—to the external observer which in turn verifies that the measurements originate from the server from which the service is received. Consequently, the monitoring of the server performance (or of another operational attribute) may be performed in a reliable and efficient manner.

The communication between the first observer module to the second observer module is at least integrity protected and at least the secrecy of the communication between the second observer module and the external observer is secured, in particular against intrusion from the server and external intruders.

In some embodiments, the method further comprises, performing the following steps by the second observer module:

determining an operational attribute of at least one of the server and the first execution platform;

verifying that the determined operational attribute is consistent with the measurement result received by the second observer module;

communicating the communicated result of said measurement by the second observer module to the external observer system conditioned on said verifying step.

The second observer module may be implemented as a process separate from the server, optionally even operable under the control of an operating system different from the operating system under which the server operates. However, when the second observer module and the server are operable on the same execution platform, functionality of the execution platform may be used for protecting the reporting of the measurement results.

The first observer module may be implemented as an integral part of the server, e.g. as one or more of the set of processes included in the server, or as a set of functions or functional modules included in one or more of the server processes. For the purpose of the present description, embodiments of the first observer module will also be referred to as a platform observer help function.

The integrity protection and/or the secrecy protection of the reported measurement results from the first observer module and/or the second observer module may be a cryptographic protection, e.g. using digital signatures, and or cryptographic binding of the communicated information to a determined state of the server stored by the first execution platform. For example, the communication from the second observer module to the external observer system may be performed by a remote attestation functionality of the first execution platform on which the server and the observer process are executed.

The first execution platform may comprise any suitable hardware and/or software platform for providing an execution environment for execution of the server and the platform observer system. The first execution environment may be implemented as a software module, as a hardware module or a combination thereof. For example, the first execution platform may comprise a trusted platform module (TPM), see e.g. the TPM Main Specification Level 2 Version 1.2, Revision 103 (also available as the international standard ISO/IEC 11889), or another suitable trusted computing platform. Generally, a trusted computing platform is a computing platform suitable for the protection and processing of private or secret data, where the computing platform provides isolated execution environments, where software/data is protected from external interference, and where the trusted computing platform can offer assurances about its behaviour (hardware and software environment). Embodiments of a trusted computing platform may thus include platform configuration registers (PCRs) and functionality for sealed storage and remote attestation. Generally, platform configuration registers are registers for storing platform configuration measurements.

Sealed storage (in the following also referred to as sealing) protects private information by binding it to platform configuration information, e.g. including the software and hardware being used. This means the data can be released only to a particular combination of software and hardware. Hence, generally the term sealed storage refers to a process of storing data on a platform in such a way that the data can only be retrieved if the platform is in a particular state.

The term remote attestation refers to a process of reliably reporting the platform's current state to a remote entity.

In some embodiments, the first execution platform comprises a hypervisor or other system for providing a virtualization layer that provides a separation of different operation systems, partitioning of resources such as interrupts, memory, processing time, etc. Generally a hypervisor allows multiple operating systems (and/or multiple instances of an operating system) to concurrently be executed on the same host machine.

It will be appreciated that a hypervisor may be modified to make observations instead of or in addition to the observer claw as described herein. However this would increase the complexity of the hypervisor, thus lowering the overall system performance and increasing the risk of faults in functionality and/or less assurance in security due to larger code base. Moreover the needed adaptations of the hypervisor might depend on the needed characteristics of the observer (which is related to the observed service).

The external observer system may be executed on a second execution platform different from the first execution platform, i.e. the external observer system is external to the first execution platform. In particular, the external observer system may be executed on a physical hardware platform different from and remote to the hardware platform on which the server is executed. For the purpose of the present description, the external observer system will also be referred to as an external observer. The external observer system may be connectable in communicative connection with the computer system on which the server and the platform observer system are executed, e.g. by means of a computer network such as the internet and/or by means of any other suitable communications link or network.

The external observer system may verify that the received measurement result is indicative of a measurement performed on the server providing the service in a number of different ways. In some embodiments, the external observer system communicates with the first observer module. In some embodiments, the first execution platform ensures that different servers have access to respective state information, e.g. in the form of registers, of the first execution platform, such that only one server has access to any given stored state, and verifying that the received measurement result is indicative of a measurement performed on said server may thus comprise verifying by the external observer system that the server providing the service has access to a predetermined state information stored in the first execution platform. For example, verifying may comprise binding a first secret value known by the external observer system to status information indicative of a first state of the server and stored by the first execution platform;

receiving, e.g. responsive to a request by the external observer system to receive the first secret value, from the server providing the service a second secret value; and comparing the received second secret value with the first secret value.

In particular, the status information may be stored by the first execution platform inaccessible by other servers. Receiving the second secret value may comprise receiving the second secret value from an observer module included in the server providing the service.

In some embodiments, the verification process may comprise sealing the secret value to a first state stored by the execution platform—e.g. to a first platform configuration register of a trusted platform module. Sealing a value to a first state may be any cryptographic operation that generates a sealed value from the original value such that recovering the original value from the sealed value requires access to the first state.

The present invention relates to different aspects including the method described above and in the following, corresponding methods, systems and products, each yielding one or more of the benefits and advantages described in connection with one of the above-mentioned method, and each having one or more embodiments corresponding to the embodiments described in connection with one the above-mentioned method.

More specifically, according to another aspect, a system is disclosed for determining an operational attribute of a server providing a service, the system comprising a first data processing system and an external observer system; wherein the system is configured to perform the steps of an embodiment of the method disclosed herein.

In particular, in some embodiments, the first data processing system is operable to provide a first execution platform to at least the server and a platform observer system; and having stored thereon computer program means including at least one platform observer system; wherein the at least one platform observer system is operable to cause the first data processing system to perform a measurement indicative of an operational attribute of the server providing a service; and to communicate a result of said measurement to the external observer system; wherein the communicating comprises protecting secrecy of the communicated result; wherein the external observer system comprises computer program means adapted to cause the external observer system to verify that the received measurement result is indicative of a measurement performed on said server.

Further disclosed herein are embodiments of an external observer computer system for determining an operational attribute of a server executed in a first execution platform and providing a service, the external observer system being external to the first execution platform;
wherein the external observer system is operable to receive, from a platform observer system operable on said first execution platform a result of a measurement performed by the platform observer system and indicative of an operational attribute of the server providing a service; wherein at least the secrecy of the communicated result is protected;
wherein the external observer system comprises computer program means adapted to cause the external observer system to verify that the received measurement result is indicative of a measurement performed on said server.

Further disclosed herein are embodiments of a data processing system operable to provide a first execution platform to at least a server for providing a service; and having stored thereon computer program means including at least one platform observer system; wherein the at least one platform observer system is operable, when executed on the first execution platform, to cause the data processing system to perform a measurement indicative of an operational attribute of the server providing the service; to communicate a result of said measurement to an external observer system; wherein the communicating comprises protecting secrecy of the communicated result; and to communicate at least one verification data item to the external observer system allowing the external observer system to verify that the received measurement result is indicative of a measurement performed on said server.

In some embodiments, the platform observer system comprises a first observer module included in the server, and a second observer module executable on the first execution platform; wherein the first observer module is operable to cause the first data processing system to perform said measurement indicative of an operational attribute of the server; and to communicate a result of said measurement to the second observer module, wherein the communicating comprises integrity protecting the communicated result; wherein the second observer module is operable to cause the first data processing system to communicate the communicated result of said measurement to the external observer system.

Further disclosed herein is a computer program product for determining an operational attribute of a server providing a service, the computer program product comprising program code means adapted to perform, when executed on a data processing system, to cause the data processing system to perform the steps of an embodiment of a method described herein.

The computer program product may comprise at least one platform observer software module executable on a first execution platform of a first data processing system; and an external observer module executable on an external observer system;
wherein the at least one platform observer software module is operable to be executed by the first data processing and operable to cause the first data processing system to perform a measurement indicative of an operational attribute of the server providing a service; and to communicate a result of said measurement to the external observer system; wherein the communicating comprises protecting secrecy of the communicated result;
wherein the external observer module is adapted to cause the external observer system to verify that the received measurement result is indicative of a measurement performed on said server.

In some embodiments, the at least one platform observer software module comprises a first and a second observer module;
wherein the first observer module is operable to be executed by the first data processing as an integral part of the server, and operable to cause the first data processing system to perform said measurement indicative of an operational attribute of the server providing a service; and to communicate a result of said measurement to the second observer module, wherein the communicating comprises integrity protecting the communicated result;
wherein the second observer module is adapted to be executed as an observer process on the first execution platform, and operable to cause the first data processing system to communicate the communicated result of said measurement to the external observer system.

BRIEF DESCRIPTION OF THE DRAWINGS

The above and other aspects will be apparent and elucidated from the embodiments described in the following with reference to the drawing in which.

DETAILED DESCRIPTION

Figure 1:
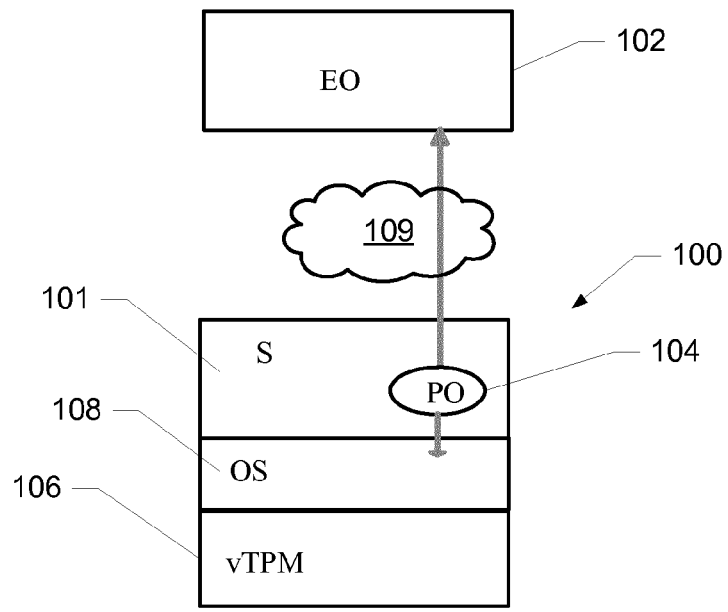
FIG. 1 shows a schematic block diagram of an example of a system for determining an attribute of a server.

FIG. 1 shows a schematic block diagram of an example of a system for determining an attribute of a server.

The system comprises a server system 100 and an external observer system 102 connected to the server system via a communications network 109. The server system 100 executes a server processes (in the following also referred to as server) 101 operable to provide a service, and includes a platform observer function 104 comprised in the server 101. The server 101 is executed on an operating system (OS) 108 which in turn is executed on a trusted platform (TP) 106.

The platform observer function may be operable to observe the server's service capacity or another operational attribute of the server 100. For example, the platform observer may be operable to observe the server's service capacity by assessing the OS capacity. The platform observer function is further operable to report the measurement result to the external observer system.

In this example, the communication of the measurement result from the observer function to the external observer 102 may be encrypted, thus protecting the measurement results against access by external entities. However, when the server 101 in which the observer function 104 may gain access to the encryption key used for that encryption.

The communication of the observations to the external observer may be bound to the trusted platform. However, this still does not prevent the server 101 from adapting its operation during the actual measurement, resulting in a misleading observation. Furthermore, in a virtualised system, the relation between a server and trusted platform is not necessarily one-to-one, and there is a risk that the measurements reported to the external observer originate from a rogue server.

Figure 2:
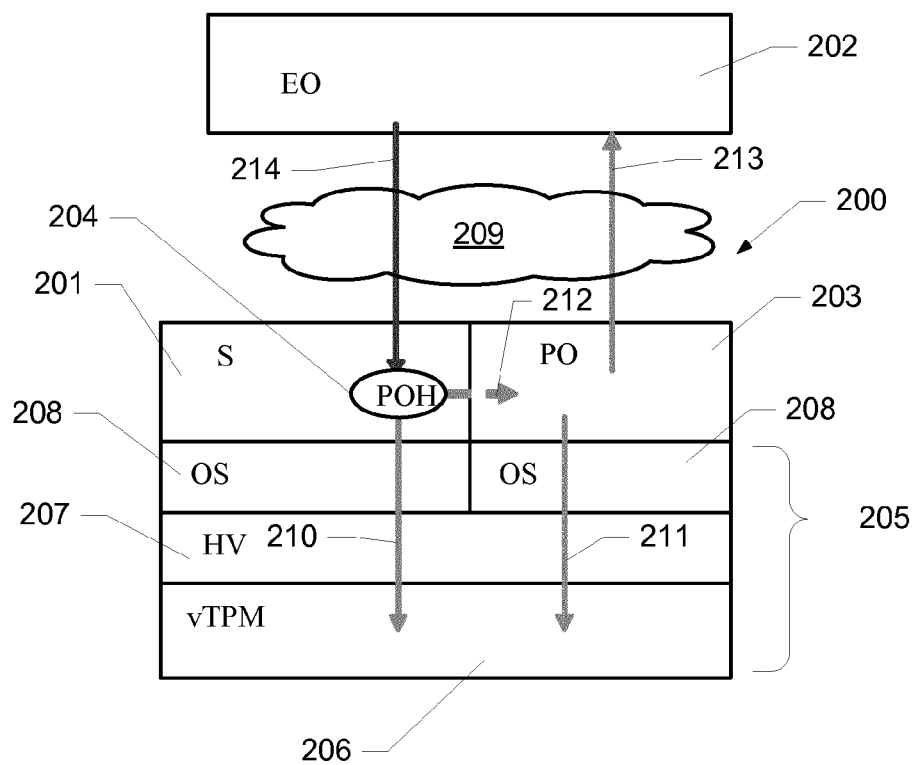
FIG. 2 shows a schematic block diagram of an example of a system for determining an attribute of a server.

FIG. 2 shows a schematic block diagram of an example of a system for determining an attribute of a server.

The system comprises a server system 200 and an external observer system 202 connected to the server system via a communications link or network 209. The communications network may be any suitable communications network such as a computer network e.g. the internet.

In the example of FIG. 2, the server system 200 is a virtualised server system. The server system 200 is operable to execute one or more server processes (in the following also referred to as server) 201 operable to provide a service. The server system 200 is further operable to execute a platform observer process 203, in the following also referred to as platform observer (PO) 203. The server 201 comprises a platform observer module 204 operable to cooperate with the platform observer 203. The platform observer module may be implemented as an integral part, e.g. as a set of functions, of the server process or as one of a number of server processes. For the purpose of the present description, the platform observer module will also be referred to as platform observer help function (POH), as it cooperates with and provides functionality to the platform observer 203.

The server 201 and the platform observer 203 are executed on an execution platform 205. In the example of FIG. 2, the execution platform comprises a virtual Trusted Platform Module (vTPM) 206, a hypervisor 207 on the virtual Trusted Platform Module 206, and one or more operating systems (OS) 208.

The server system 200 is operable to use the vTPM to implement a trusted boot of the hypervisor (also called VMM), the operating systems, the server software, and the platform observer process. Hence, the external observer, the platform observer, the operating system on which the platform observer is executed, the hypervisor, and the trusted platform module may be regarded as trusted entities, while the trust does not necessarily extend to the server and the operating system on which it is executed.

In the example of FIG. 2, the platform observer process is executed on an operating system different from the operating system of the server software. It will be appreciated, however, that the server software and the platform observer process may be executed by the same operating system.

The platform observer 203 may thus use vTPM remote attestation capabilities to securely report its observation to an external entity such as the external observer system 202.

The platform observer 203 is operable to observe, in cooperation with the platform observer module 204, the server's service capacity or another operational attribute of the server 200, as indicated by arrows 210 and 211. For example, the platform observer 203 and/or the platform observer module 204 may be operable to observe the server's service capacity by assessing the OS capacity.

In particular, the platform observer module 204 may perform a measurement 210 and communicate the measurement result to the platform observer 203 as indicated by arrow 212. The communication 212 may be integrity protected so as to allow verification of the integrity of the communicated measurement result by the platform observer 203.

Accordingly, the platform observer may verify the integrity of the received measurement. The platform observer may further perform its own measurement 211 so as to determine whether the received measurement result is consistent with its own measurement.

The platform observer may then send the received measurement result to the external observer 202, as indicated by arrow 213. The communicated results may be encrypted so as to protect its secrecy against access by outside entities and by the server 201.

The external observer 202 may thus use the received information to verify that the agreed capacity was available. To assure that the reported information is indeed coupled to the server that is offering the service (and not that of another server), the external observer makes observations (as indicated by arrow 214) on the server, e.g. by means of the platform observer module 204, and may use the vTPM attestation functions, or another secure attestation function of the server system, to securely assess information of the server and the environment it is running on. Embodiments of the attested observations of the platform observer and of the external observer ensure that there is a dependency which gives the external observer the assurance that the information indeed relates to the system where the server is running and not any rogue system. An example of a suitable process for performing, protecting, and communicating the observations will be described in greater detail below.

The combination of an external observer and a platform observer forms what may be called an observer claw around the server. An embodiment of the observation process may be summarised as follows: The platform observer help function performs a measurement of an operational attribute of the server at a given measurement time. The measurement result is securely communicated to the external observer via a trusted middleman in the form of the platform observer process such that neither outsiders nor the server can get access to the measurement result. The external observer performs a verification that the received measurement result actually relates to the server that provides the service or that is expected to provide the service.

The hypervisor functionality is transparent and no additional functionality is required from it. Furthermore, no capacity is wasted by having the external observer perform capacity measurements. Furthermore, the likelihood of obtaining misleading observations is decreased, e.g. the risk of the serving system momentary increasing its capacity when the measurements start.

Figure 3:
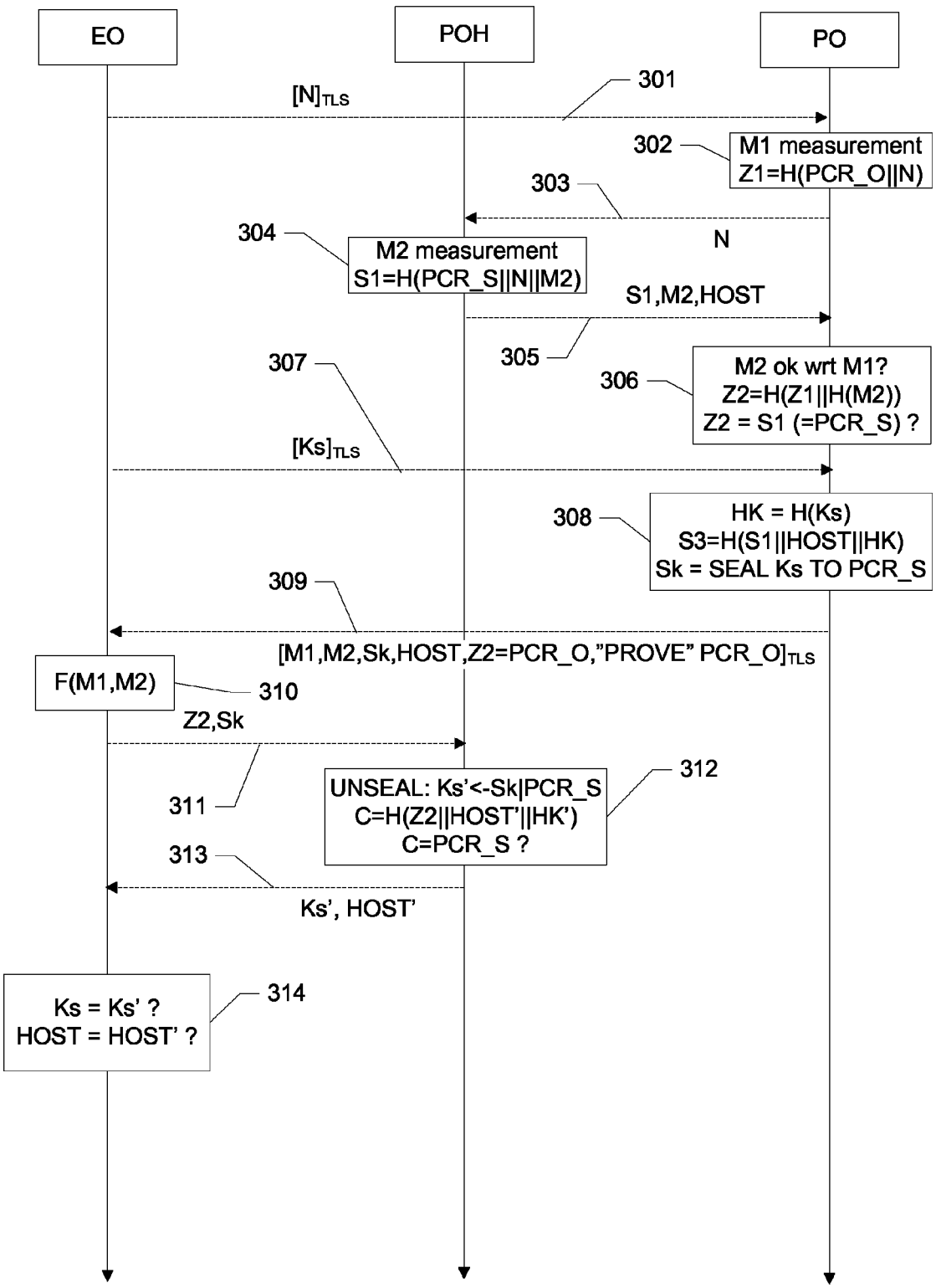
FIG. 3. schematically illustrates an example of a process for determining an attribute of a server.

FIG. 3. schematically illustrates an example of a process for determining an attribute of a server. The process is performed by the external observer (EO), e.g. the external observer system 202 of FIG. 2, a platform observer help function (POH), e.g. the platform observer module 204 of FIG. 2, and a platform observer (PO), e.g. the platform observer process 203 of FIG. 2.

For the purpose of the description of this embodiment, it will be assumed that the server, including the POH, and the PO use a vTPM or a similar platform module providing registers for storing platform configuration measurement, remote attestation and sealing functionalities. However, it will be appreciated that other mechanisms for securely binding information to a state of the server may be used.

The process is initiated by the external observer sending a measurement request 301 to the platform observer. The measurement request may comprise a nonce N, i.e. a number used once, e.g. in the form of a random or pseudo-random number issued by the external observer system to ensure that measurement requests cannot be reused in replay attacks. The nonce may be TLS protected or protected by any other suitable secure communication mechanism.

In response to the measurement request, in step 302, the platform observer (PO) makes a measurement M1 of the underlying capacity or another operational parameter of the server (not explicitly shown in FIG. 3), e.g. by measuring the system architecture (e.g. number of CPU cores) and the number of executed instructions per second. The platform observer then extends a PCR of the vTPM associated with the platform observer (in the following referred to as PCR_O), with the received nonce N:

$$Z\_1 = PCR\_O(\text{new state}) = {}_H(PCR\_O(\text{old state})\|_N)$$

Here and in the following, H(•) refers to any suitable hash function, e.g. SHA1. "∥" denotes a sequential append and processing operation, i.e. H(old_state∥A∥B) means: first append old_state with A and hash, then append the output with B and hash again, i.e. H(old_state∥A∥B)=H(H(old_state)|A)|B) where "|" is the ordinary string append operation.

Next the platform observer sends a measurement request 303, e.g. makes locally a remote call, to the observer help function (POH) in the server. The communication between the platform observer and the platform observer help function may be secured via standard protection mechanisms, but as no secret information is sent, only integrity protection may be necessary (e.g. TLS with null encryption). The measurement request to the POH also includes the nonce N received from the external observer.

In step 304, the POH performs a suitable measurement and collects static information associated with the server. The platform observer help function may perform a simple capacity measurement on instructions per second that are available and may collect information about predetermined OS tables, e.g. the Interrupt Description Table (IDT), the Interrupt Description Table Register (IDTR) and/or the Global Descriptor Table (GDT). These tables are fundamental for the OS and certain data in these tables and location are unique and static during operation. It will be appreciated that while x86 architectures comprise the above tables, other processor architectures have similar tables and/or other static characteristics that may be observed by the platform observer help function and that may be used by the external observer to establish that the measurement is related to the server that is assumed to provide the service. Embodiments of the process described herein may use location information and possible other static information from these tables and or other suitable location information and/or static information associated with the operating system and/or the server.

For the purpose of the present description, the measurement performed by the POH will be referred to as M2. The platform observer help function may compute a cryptographic hash of the collected static information, e.g. the static information from the OS tables. The resulting hash will be referred to as HOST ("Hash OS Tables"). The values of HOST and the hash of M2 are used to update a PCR (in the following referred to as PCR_S) in the vTPM associated with the server:

$$S\_1 = PCR\_S(\text{new state}) = H(PCR\_S(\text{old state})\|N\|H(M2))$$

It may be interesting to note that after initialization of the system, PCR_O and PCR_S have both the state "zero". Thus one may assume PCR_S(old state)=PCR_O(old state)="zero" after initialization and hence $$Z\_2 = H(Z\_1\|H(M2)) = S\_1$$

It is further worthwhile noting that each server has access to one PCR only, i.e. not to PCRs associated with other servers, while the platform observer has access to all PCRs.

The platform observer help function now securely forwards, e.g. by the same mechanism as the message 303 above, a message 305 comprising HOST, M2, and S1 to the platform observer PO.

In step 306 the platform observer compares the received measurement M2 with its own observation M1 so as to determine whether the received measurement is consistent with M1. For example, the measurement M1 may contain a measurement of the number of instructions per second that is available and M2 may contain the similar amount observed in the server. Knowing (through the license agreement) that S should get a certain amount of the capacity, the PO can compare if the ratio of the two observations falls within acceptable limits. On failure, the PO may report this to the EO and possibly to the owner of the platform.

The platform observer then extends PCR_O with H(M2) and checks that PCR_O=S1:

$$Z2 = PCR\_O(\text{new state}) = H(Z1\|H(M2)).$$

If Z2=S1, the platform observer has determined that the received M2 comes from the same system (that the vTPM provides security for).

The EO now securely (e.g. TLS protected) forwards a secret session key Ks to the platform observer in a message 307. Alternatively, Ks may be included in the initial message 301.

In step 308, the platform observer computes a hash of the received session key:

$$HK = H(Ks).$$

The platform observer further seals the session key to PCR_S of the vTPM. The sealed key is denoted by Sk:

$$Sk = SEAL\ Ks\ \text{to}\ PCR\_S.$$

It may be interesting to recall from the TPM specification (see e.g. TCG publication, TPM Main Part 3 Commands, Specification Version 1.2) that sealing and unsealing is defined through the mappings
(C,MACKroot((index0, PCRindex0), (index1, PCRindex1), . . . ))←Seal(indices, data) data←Unseal(C, MACKroot((index0, PCRindex0), (index1, PCRindex1), . . . ))
where Storage Root Key (Kroot), is a key that never leaves the TPM. Hence sealing is done to a specific set of PCRs (indices) and their values.

To compute Sk the PO extends PCR_S as follows $$S3 = PCR\_S(\text{new state}) = H(S\_1\|HOST\|HK)$$

where HK is the hash of Ks, and seals Ks to PCR_S.

It may be interesting to note that by the property of (cryptographic) hash functions a rogue server cannot deduce the value of Ks from observing the change of the PCR_S value.

Next, the platform observer sends a message 309 to the external observer including the sealed value SKs and M1, M2, HOST, PCR_O, and "proof" PCR_O. Such a proof could be a standard remote attestation of the PCR_O or a similar procedure using digital signatures by which the EO can verify that the received PCR_O value is authentic. This data may be singed by the vTPM. Message 309 may again be suitably protected, e.g. TLS protected.

In step 310, the external observer uses the measurements M1 and M2 to compute the capacity of the server. For example in the case of a single service running on the server, the external observer may empirically determine a capacity function F whose value depends on M1 and M2, i.e., F(M1, M2). In practice this may only need to be a rough estimate to serve its purpose.

An example of such a capacity function may be implemented as follows: Let M1 and M2 be two time difference measurements where M1 is the time elapsed between two code points in the PO code and M2 in that of the POH.

Knowing the number of instructions that are executed between the code points allows one to determine the capacity (in number of instructions per time unit). Denote these C1 and C2. If I1 is the number of instructions between the measuring code points in PO and I2 the number of instructions between the code points in POH then we have Ci=Ii/Mi for i=1,2 if we 100% could rely on the measurements M1 and M2. Now empirically the EO may derive that M2 approx equals c M1 for some constant c. Thus a reasonable estimate of the server capacity would be the geometric mean of C2 and I2/(c M1), i.e. Sqrt(C2×(I2/(c M1))=I2×Sqrt(1/(c M1 M2)). It will be appreciated, however, that, based on the system design and/or the type of observations, other functions may be used.

To be sure that the measurements M1 and M2 originate from the same server as one is observing externally (the one that is actually providing the service), the EO sends a message 311 including Sk and Z2 to the observer help function in the server. It may be interesting to note that the POH is not required to keep a state.

In step 312 the POH uses the vTPM PCR_S to unseal Sk and computes the Hash HK' of the resulting secret key Ks'. Next the POH determines HOST' (i.e. the same static information and/or location information previously determined in step 304) of its OS system and computes $$C=H(Z\_2\|HOST'\|HK'),$$

i.e. POH may be seen as simulating an extension of PCR_O. Accordingly, it may be noted that if HOST'=HOST then C=PCR_S. Consequently POH may perform a local check by comparing C (the simulated PCR_O) with PCR_S. Hence, since also the POH can check the PCRs in this way, it can signal inside the server that something is wrong, if the PCR_S and PCR_O are not equal at this point.

Subsequently, POH sends a message 313 to the external observer including the computed secret key Ks' and the static information HOST'.

In step 314, the external observer may thus verify that the received measurements originate from the same server that provides the service by comparing the values of the secret key and the HOST values i.e. by comparing HOST with HOST' and Ks with Ks'.

Furthermore, by the property of the hash function used to extend the PCRs, if PCR_S=PCR_O that it will be extremely unlikely that HOST' differs from HOST. Thus if EO will be given PCR_O with a remote attestation and if PCR_S=PCR_O, the measurements can be accepted as valid and otherwise an alarm condition is triggered.

One can describe the above setup as the two observers forming a claw around the virtual server that will protect the server from being placed/operated in an undesired system.

It is obvious that the above described observer claw can be used in a licensing system to achieve guarantees that the agreed capacity is available without having to waste hardly any capacity on measuring the delivered service. Furthermore, the proposed observer claw ran be implemented using existing technology for hypervisors and trusted platforms.

Generally, embodiments of the method and system described herein may be applied to cases where it is desired to have a service from a server (or "in the cloud") and where it is desired to guarantee that the agreed service is actually received. Examples of such situations may include situations where a network operator rents an HLR/AuC server and wants to ensure that the obtained/sold capacity corresponds to the agreed capacity. Another examples is a situation where a hardware manufacturer sells an HLR/AuC server and wants to ensure that the used capacity corresponds to the agreed capacity. Yet another example may involve a company that outsources a number of data processing functions by placing them in a (cloud) server and wants to ensure that the obtained/sold service corresponds to the agreed service.

Several variations of the above embodiments are possible. For example, the order of some of the above steps may be interchanged. Similarly, some of the steps may be performed by a different entity. For example, instead of being generated by the external observer, the nonce N and/or the secret key Ks may be generated by the platform observer and communicated to the external observer, e.g. in message 309.

Figure 4:
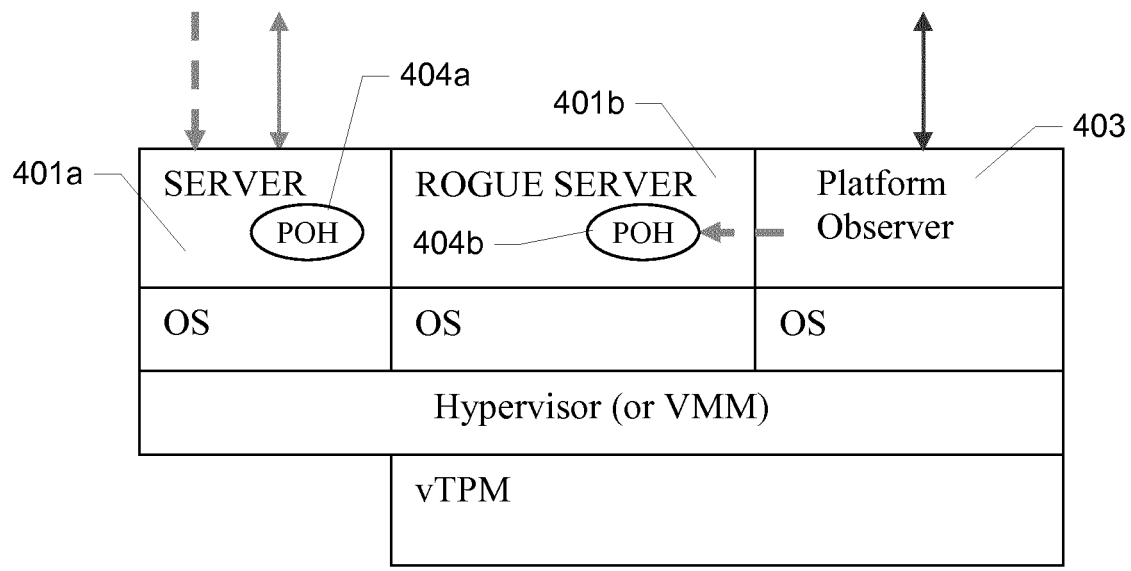
FIG. 4 schematically illustrates operation of an embodiment of the system described herein in a situation where the server providing the service is not identical to the server on which the performance measurement is performed.

FIG. 4 schematically illustrates operation of an embodiment of the system described herein in a situation where the server providing the service is not identical to the server on which the performance measurement is performed.

Hence, the measurements performed by the POH 404b of the Rogue server 401b, and communicated via the platform observer 403 to the external observer (not shown in FIG. 4) do not reflect the capacity of the actual server 401a that provides the service. However, this discrepancy may be detected by the external observer when it contacts the POH 404a of the server providing the service to verify the attested information.

Although some embodiments have been described and shown in detail, the invention is not restricted to them, but may also be embodied in other ways within the scope of the subject matter defined in the following claims.

For example, in the above, examples have been described of a server with a secure bootstrap functionality and a functionality to securely attest on certain state parameters. Such functionality can be realized for example by a TPM and in the case of a virtual system by a virtual TPM as shown above. However, it will be appreciated that, even the methods and systems described herein has mainly been disclosed in the context of a (virtual) TPM, embodiments of the methods and systems described herein are not limited to the use of a (virtual) TPM. Other, solutions of similar nature as TPM, can be used.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of carrying out a performance verification of a server executing on a server system executed on a trusted platform having a platform observer function executing as a trusted entity independent from the server, the method performed by a node operating as an external observer function and comprising:

triggering the platform observer function to make a first performance measurement of the trusted platform, and to request a second performance measurement of the server by a platform observer helper function executing on the server;

receiving a performance measurement response from the platform observer function that includes:
  the first and second performance measurements;
  a hash of static operating system state information maintained by the server, as provided to the platform observer function by the platform observer helper function in conjunction with the second performance measurement;
  a sealed key generated as a function of a secret key known between the platform observer function and the external observer function and sealed to the current value of a first register that is maintained by the platform observer helper function and updated each time the platform observer function requests a new performance measurement of the server; and
  a verification value that depends on a nonce and the current value of a second register that is maintained by the platform observer function in correspondence with the first register and is updated by the platform observer function each time the platform observer function requests a new performance measurement of the server; and
verifying that the first and second performance measurements agree with known values corresponding to an overall performance of the trusted platform and a targeted performance of the server; and
verifying that the second performance measurement corresponds to the server by:
  sending the sealed key and the verification value to the platform observer helper function;
  receiving return verification data from the platform observer helper function comprising a new hash of the static operating system state information maintained by the server, and a derived key that is derived from the sealed key by the platform observer function helper using the current value of the first register at the platform observer helper function; and
  determining that the second performance measurement corresponds to the server, based on verifying that the new hash of the static operating system state information matches the corresponding hash previously received from the platform observer function, and that the derived key matches the secret key; and
responsive to determining that the second performance measurement corresponds to the server, generating an indication of whether the second performance measurement agrees with the targeted performance of the server.

2. The method of claim 1, wherein the nonce identifies the performance verification, and wherein each subsequent performance verification involves a new nonce.

3. The method of claim 1, further comprising providing at least one of the nonce and the secret key to the platform observer function via Transport Layer Security (TLS) protocol signaling, as part of triggering the platform observer function to make the first performance measurement of the trusted platform, and to request the second performance measurement of the server by the platform observer helper function executing on the server.

4. The method of claim 1, further comprising receiving at least one of the secret key and the nonce from the platform observer function via Transport Layer Security (TLS) protocol signaling.

5. The method of claim 1, further comprising receiving a proof of the verification value in conjunction with the verification value, and conditioning on proving the verification value via a remote attestation procedure executed with the platform observer function said steps of verifying that the first and second performance measurements agree with known values corresponding to the overall performance of the trusted platform and the targeted performance of the server, and verifying that the second performance measurement corresponds to the server.

6. The method of claim 1, further comprising providing a proof of the second verification value in conjunction with providing the second verification value to the external observer function, and performing a remote attestation procedure with the external observer function in association with the proof.

7. A node configured to carry out a performance verification of a server executing on a server system executed on a trusted platform having a platform observer function executing as a trusted entity independent from the server, the node operative as an external observer function relative to the server and comprising:
  interface circuitry configured to communicatively couple the node to the platform observer function and to a platform observer helper function that executes on the server; and
  processing circuitry operatively associated with the interface circuitry and configured to:
    trigger the platform observer function to make a first performance measurement of the trusted platform, and to request a second performance measurement of the server by the platform observer helper function;
    receive a performance measurement response from the platform observer function that includes:
      the first and second performance measurements;
      a hash of static operating system state information maintained by the server, as provided to the platform observer function by the platform observer helper function in conjunction with the second performance measurement;
      a sealed key generated as a function of a secret key known between the platform observer function and the external observer function and sealed to the current value of a first register that is maintained by the platform observer helper function and updated each time the platform observer function requests a new performance measurement of the server; and
      a verification value that depends on a nonce and the current value of a second register that is maintained by the platform observer function in correspondence with the first register and is updated by the platform observer function each time the platform observer function requests a new performance measurement of the server; and
    verify that the first and second performance measurements agree with known values corresponding to an overall performance of the trusted platform and a targeted performance of the server; and
    verify that the second performance measurement corresponds to the server, based on being configured to:
      send the sealed key and the verification value to the platform observer helper function;
      receive return verification data from the platform observer helper function comprising a new hash of the static operating system state information maintained by the server, and a derived key that is derived from the sealed key by the platform observer function helper using the current value of the first register at the platform observer helper function; and
      determine that the second performance measurement corresponds to the server, based on verifying that the new hash of the static operating system state information matches the corresponding hash previously received from the platform observer function, and that the derived key matches the secret key; and responsive to determining that the second performance measurement corresponds to the server, generate an indication of whether the second performance measurement agrees with the targeted performance of the server.

8. A method of carrying out a performance verification of a server executing on a server system executed on a trusted platform having a platform observer function executing as a trusted entity independent from the server, the method performed by the platform observer function and comprising:

receiving a performance measurement request from a node operating as an external observer function with respect to the server and trusted platform, requesting a performance measurement of the server; and triggering the performance measurement responsive to the performance measurement request, including:

performing a first performance measurement of the trusted platform;

requesting a second performance measurement of the server by a platform observer helper function executing on the server, and providing a nonce to the platform observer helper function in association with requesting the second performance measurement; and receiving the second performance measurement from the platform observer helper function, along with a hash of static operating system state information maintained by the server, as determined by the platform observer helper function, and a first verification value that depends on the nonce and the current value of a first register that is maintained by the platform observer helper function and updated each time the platform observer function requests a new performance measurement of the server by the platform observer helper function;

determining whether first verification value matches a second verification value generated by the platform observer function in dependence on the nonce and the current value of a second register that is maintained by the platform observer function in correspondence with the first register and is updated by the platform observer function each time the platform observer function requests a new performance measurement of the server by the platform observer helper function; and responsive to the first and second verification values matching:

generating a sealed key as a function of a secret key known between the platform observer function and the external observer function and sealed to the first verification value; and sending a performance measurement response to the external observer function that includes:

the first and second performance measurements;

the hash of static operating system state information maintained by the server, as provided to the platform observer function by the platform observer helper function in conjunction with the second performance measurement;

the sealed key; and the second verification value.

9. The method of claim 8, wherein the nonce identifies the performance verification, and wherein each subsequent performance verification involves a new nonce.

10. The method of claim 9, further comprising providing at least one of the nonce and the secret key to the external observer function via Transport Layer Security (TLS) protocol signaling.

11. The method of claim 9, further comprising receiving at least one of the secret key and the nonce from the external observer function via Transport Layer Security (TLS) protocol signaling;

the following is an examiner's statement of reasons for allowance: the prior art of record fail to teach receiving a performance measurement response from the platform observer function that includes: the first and second performance measurements; a hash of static operating system state information maintained by the server, as provided to the platform observer function by the platform observer helper function in conjunction with the second performance measurement;

a sealed key generated as a function of a secret key known between the platform observer function and the external observer function and sealed to the current value of a first register that is maintained by the platform observe helper function and updated each time the platform observer function requests a new performance measurement of the server; and a verification value that depends on a nonce and the current value of a second register that is maintained by the platform observer function in correspondence with the first register and is updated by the platform observer function each time the platform observer function requests a new performance measurement of the server; and verifying that the first and second performance measurements agree with known values corresponding to an overall performance of the trusted platform and a targeted performance of the server; and verifying that the second performance measurement corresponds to the server by: sending the sealed key and the verification value to the platform observer helper function;

receiving return verification data from the platform observer helper function comprising a new hash of the static operating system state information maintained by the server, and a derived key that is derived from the sealed key by the platform observer function helper using the current value of the first register at the platform observer helper function; and determining that the second performance measurement corresponds to the server, based on verifying that the new hash of the static operating system state information matches the corresponding hash previously received from the platform observer function, and that the derived key matches the secret key; and responsive to determining that the second performance measurement corresponds to the server, generating an indication of whether the second performance measurement agrees with the targeted performance of the server.

12. An apparatus configured to operate as a platform observer function on a trusted platform and to carry out a performance verification of a server executing on a server system executed on the trusted platform, said platform observer function configured as a trusted entity independent from the server, and said apparatus comprising:

interface circuitry configured to communicatively couple the platform observer function to a platform observer helper function operating on the server, and to an external observer function operating external with respect to the server and the trusted platform; and processing circuitry operatively associated with the interface circuitry and configured to:
- receive a performance measurement request from a node operating as the external observer function, requesting a performance measurement of the server; and
- trigger the performance measurement responsive to the performance measurement request, based on being configured to:
  - perform a first performance measurement of the trusted platform;
  - request a second performance measurement of the server by the platform observer helper function, and providing a nonce to the platform observer helper function in association with requesting the second performance measurement; and
  - receive the second performance measurement from the platform observer helper function, along with a hash of static operating system state information maintained by the server, as determined by the platform observer helper function, and a first verification value that depends on the nonce and the current value of a first register that is maintained by the platform observer helper function and updated each time the platform observer function requests a new performance measurement of the server by the platform observer helper function;
  - determine whether first verification value matches a second verification value generated by the platform observer function in dependence on the nonce and the current value of a second register that is maintained by the platform observer function in correspondence with the first register and is updated by the platform observer function each time the platform observer function requests a new performance measurement of the server by the platform observer helper function; and
- responsive to a determination by the processing circuitry that the first and second verification values match:
  - generate a sealed key as a function of a secret key known between the platform observer function and the external observer function and sealed to the first verification value; and
  - send a performance measurement response to the external observer function that includes:
    - the first and second performance measurements;
    - the hash of static operating system state information maintained by the server, as provided to the platform observer function by the platform observer helper function in conjunction with the second performance measurement;
    - the sealed key; and
    - the second verification value.

* * * * *